Patented July 13, 1948

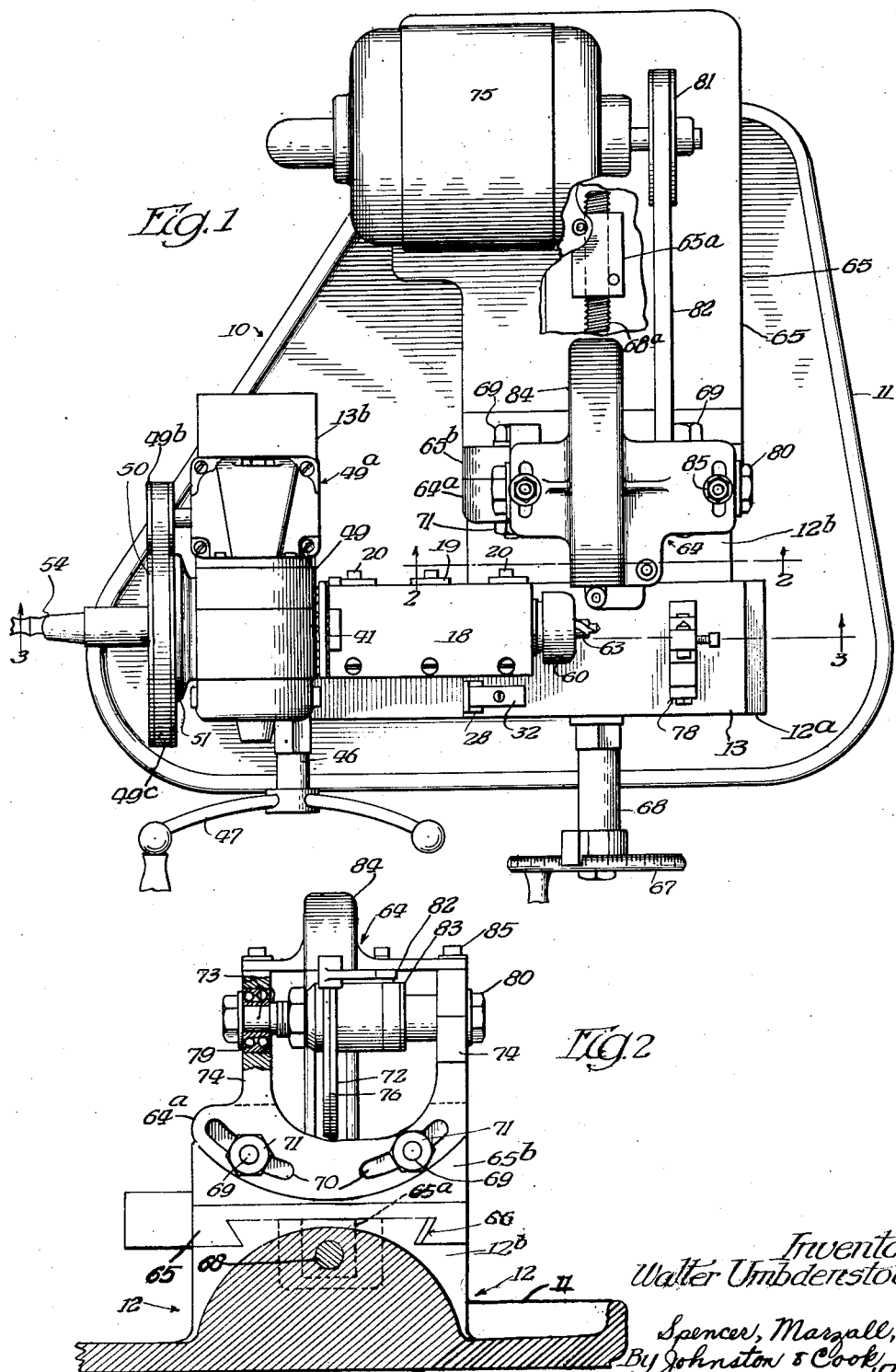

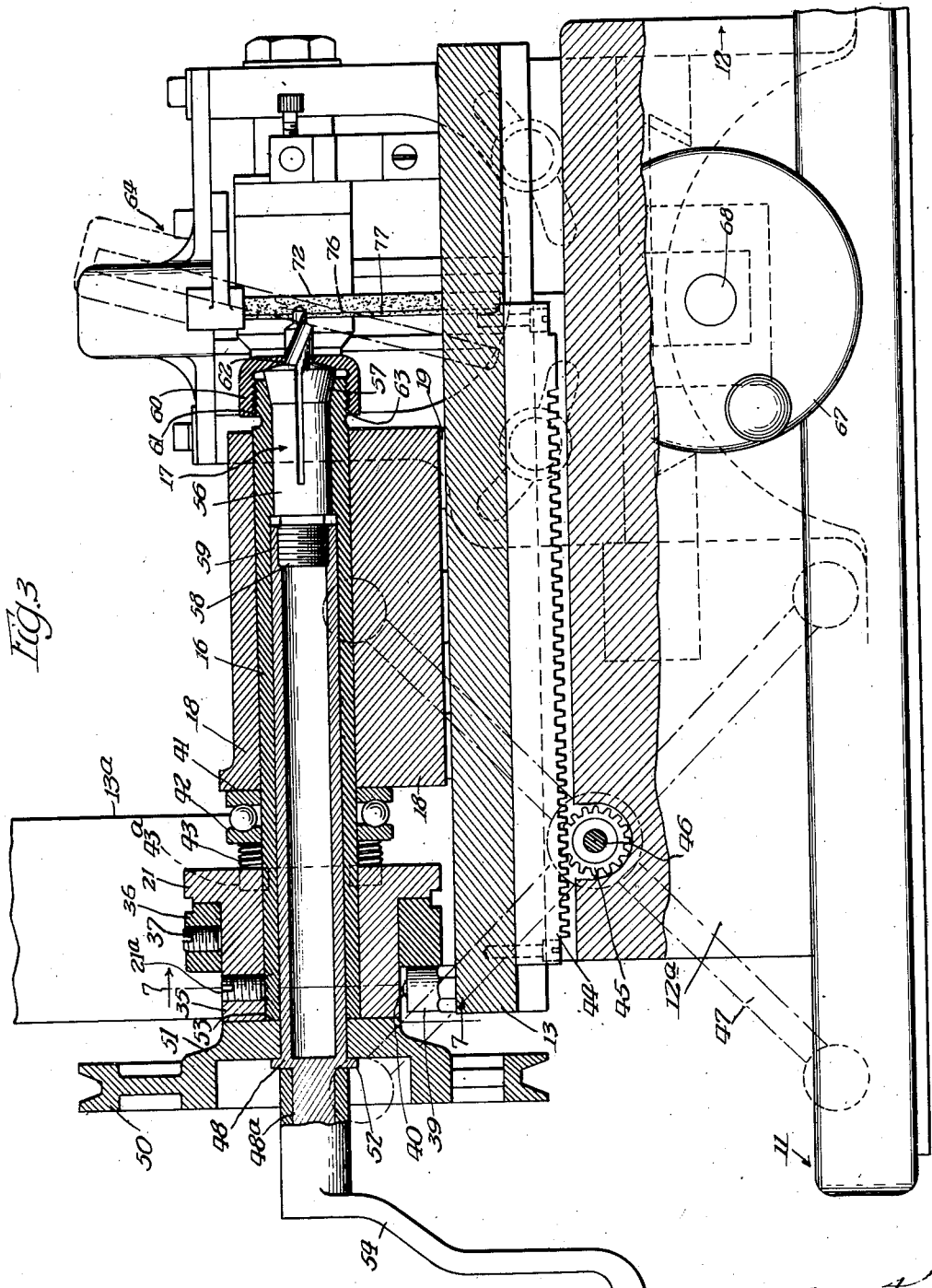

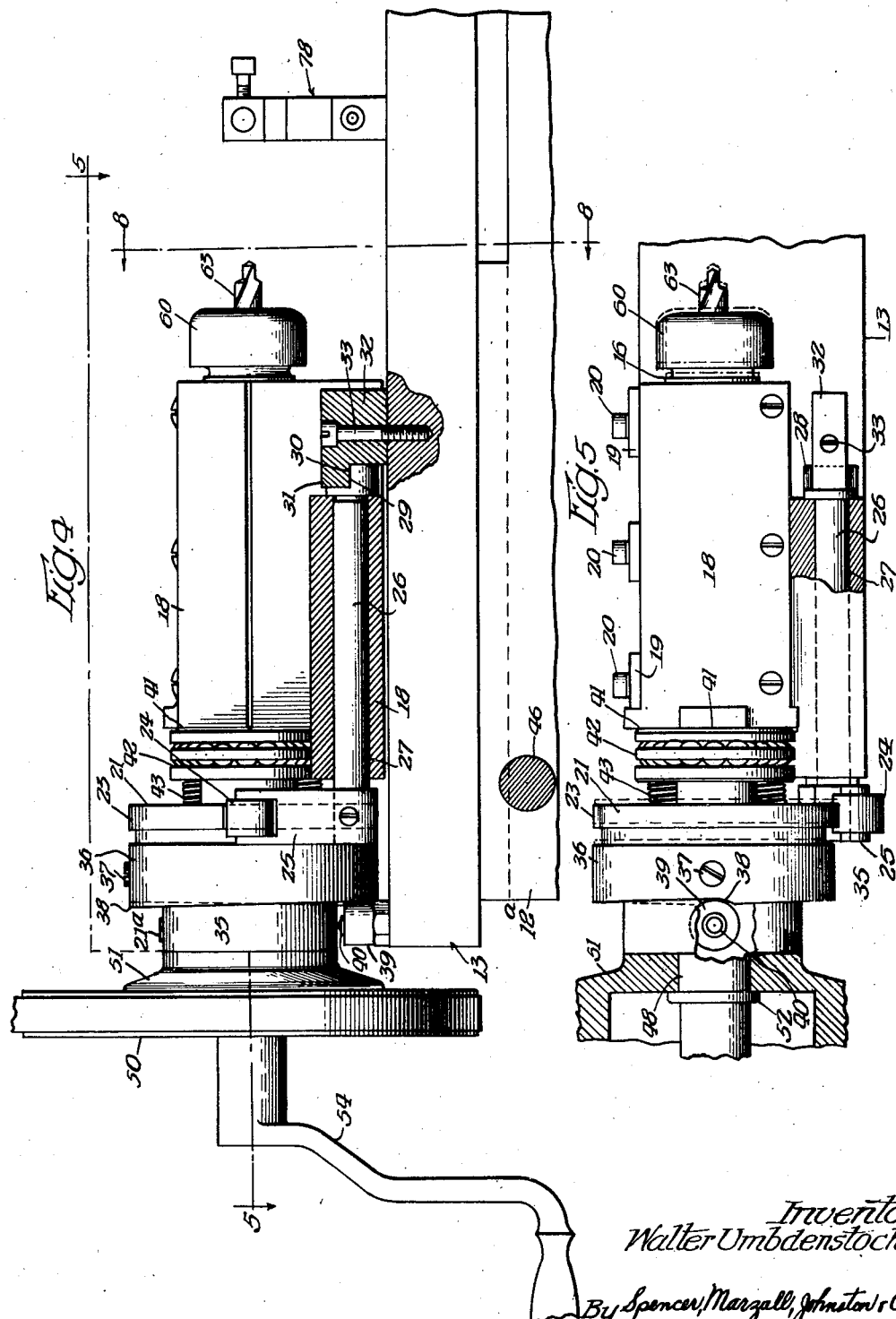

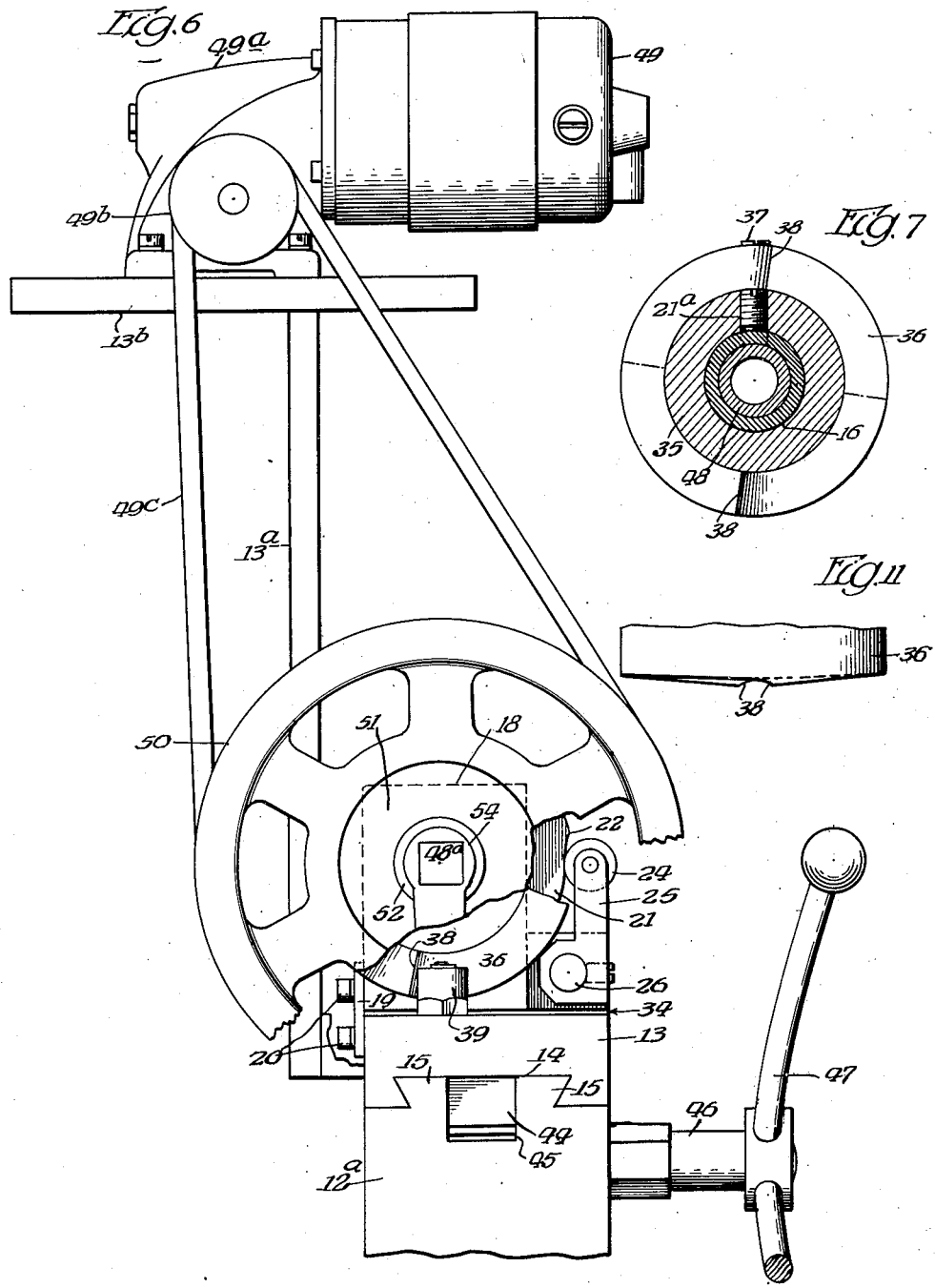

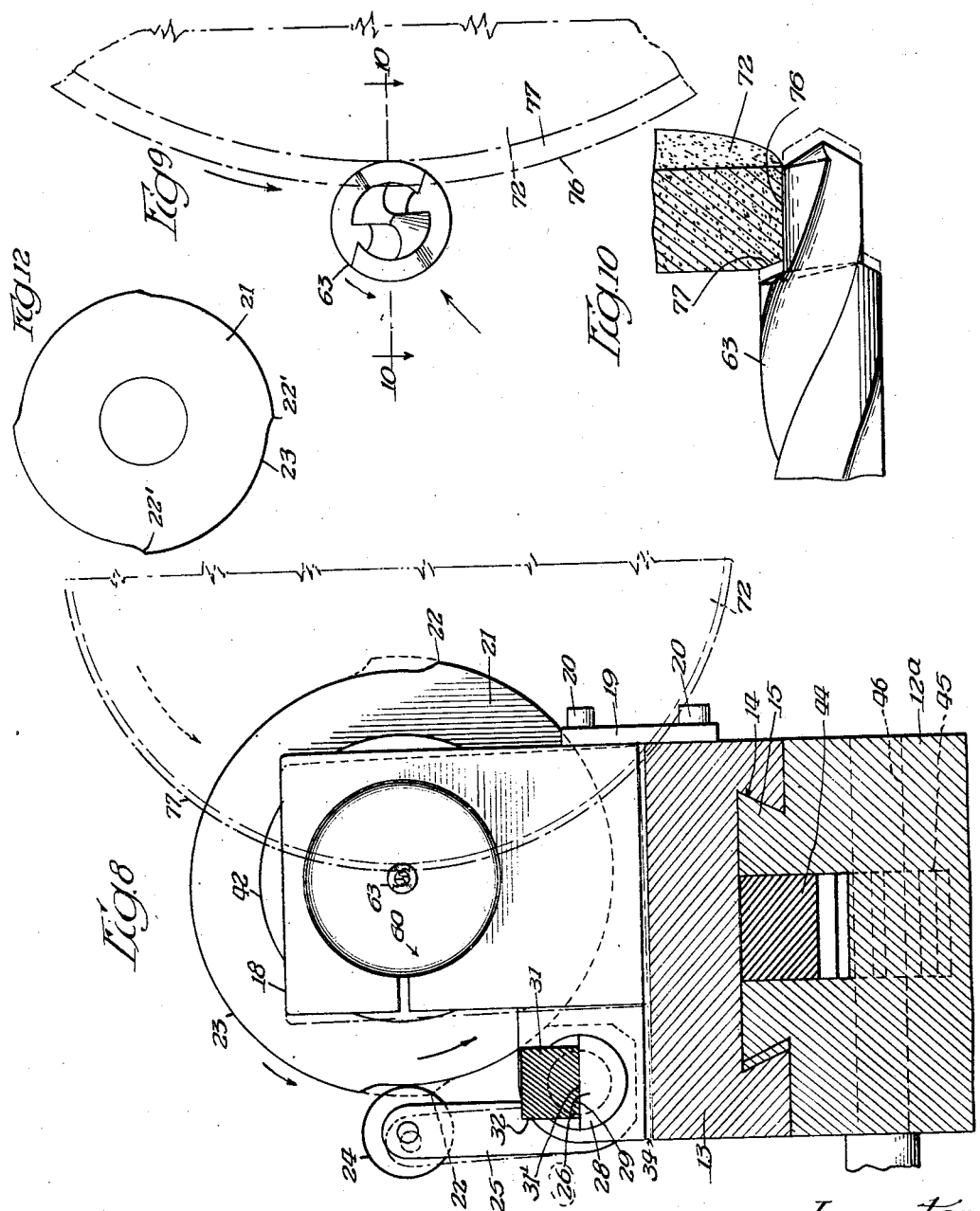

2,445,194

UNITED STATES PATENT OFFICE 2,445,194

GRINDING MACHINE

Walter Umbdenstock, Chicago, Ill., assignor to Lion Manufacturing Corporation, Chicago, Ill., a corporation of Illinois Application October 30, 1943, Serial No. 508,281

10 Claims. (Cl. 51—94)

This invention relates to drill grinding machines and particularly to a machine for grinding a multiple step drill.

An object of this invention is to provide a machine which will grind a multiple step drill so as to form a desired rake or clearance between the leading edge and the heel or trailing edge of the drill both radially and longitudinally of the drill.

Another object of the invention is to provide a drill grinding machine in which the drill is rotated during the grinding operation and simultaneously reciprocated both transversely and longitudinally in relation to an adjustable grinding wheel so as automatically to shape the drill to present a predetermined rake or clearance between its leading edge and its heel or trailing edge, both radially and longitudinally of the drill.

This invention further resides in the combination, construction and arrangement of parts illustrated in the accompanying drawings, and while there is shown therein preferred embodiments of the invention, it is to be understood that the same are susceptible of modification and change without departing from the spirit of the invention.

The accompanying drawings illustrate a selected embodiment of the invention, and the views therein are as follows:

Fig. 1 is a plan view of a machine embodying the invention;

Fig. 2 is a partial vertical sectional view on the line 2—2 of Fig. 1;

Fig. 3 is a partial side elevation of the machine on the line 3—3 of Fig. 1 with parts of the machine shown in section and with the grinding head indicated in adjusted position by dotted lines;

Fig. 4 is a partial side elevation of the machine with parts of the machine shown in section;

Fig. 5 is a top plan view of a portion of the machine on the line 5—5 of Fig. 4, partially broken away, with some of the parts shown in horizontal section;

Fig. 6 is a left end elevation of the spindle head and part of the base of the machine;

Fig. 7 is a partial, detail sectional view on the line 7—7 of Fig. 3;

Fig. 8 is a right end elevation of the spindle head of the machine, with part of the machine shown in section, on the line 8—8 of Fig. 4;

Figs. 9 and 10 are enlarged detail views schematically showing a drill in grinding position in relation to the grinding wheel;

Fig. 11 is a detail side elevation of a portion of the machine shown in Fig. 7; and Fig. 12 is a detail right end elevation of a modified form of a part of the machine shown in Fig. 8.

The particular embodiment of the invention illustrated in the drawings is generally designated by the numeral 10 and is mounted upon a base 11 having an L-shaped upstanding block portion 12. A front slide or table 13 carrying a spindle head 18, is slidably supported upon the front leg 12a of the block 12 for longitudinal movement and a rear slide or table 65, carrying a grinding head 64, is slidably supported on the rear leg 12b of the block 12 for transverse movement.

In order to support the front table 13 for longitudinal movement, the upper surface of leg 12a is provided with a dove shaped way 15 comprising two complementary spaced portions and the underside 14 of the table 13 is shaped to be complemental with the way 15. The resulting assembly forms a simple means for accurately and slidably supporting the table 13.

A centrally disposed, longitudinally extending, depending rack 44 upon the underside 14 of the table 13 extends between the complementary spaced portions of the way 15 and is adapted to mesh with a pinion 45 fastened to a shaft 46. Shaft 46 is journaled in the leg 12a of the block 12 and is rotated by a hand wheel 47 on the front of the machine. Manipulation of the hand wheel 47 through the action of the rack and pinion, adjusts the longitudinal position of the table 13 in relation to the base of the machine.

At the left hand side of the flat upper surface of the front table 13, there is mounted a drive motor 49 and a work head or spindle head 18 and at the right there is mounted a conventional dressing tool 78 for dressing the grinding surfaces of the grinding wheel carried by the grinding head on the rear slide.

The drive motor 49 (Fig. 6) is flange mounted to a gear reducer 49a which is fastened to a flat mounting plate 13b and the entire assembly of drive motor, gear reducer, and mounting plate, is mounted upon the top of a vertical bracket 13a. Bracket 13a extends upwardly from the left end of the front slide 13 and is securely fastened to the rear side thereof.

The spindle head 18 (Fig. 8) is supported a short distance above the flat upper surface of the front slide 13 by means of several straps 19, which bridge the gap between the slide 13 and the spindle head 18. The lower end of each of the straps is secured to the rear side of the front slide 13 and the upper end of each strap is secured to the rear side of the spindle head 18 by screws 20, The spindle head 18 supports a power driven spindle 16 (Fig. 3) which is journaled in bearing surfaces bored within the spindle head and is supported therein for both rotary and reciprocatory movement. An internal bore extends the entire length of the spindle and is used to receive within the rear portion, a hollow drive shaft or draw bar 48 and to receive within the forward portion a drill holder or collet 17 for securing the drill 63 to be ground.

The forward portion of the spindle bore has a section of reduced diameter adapted to receive the shank 56 of the collet 17. Forward of the reduced diameter section, the bore is tapered outwardly to receive the slotted and correspondingly tapered head 57 of the collet 17. A cap 60 is provided with a central bore 62 and is threaded internally so that it may be screwed upon the external threads 61 at the forward end of the spindle 16. A drill 63 may be inserted in an internal bore within the collet 17 through a central bore 62 in the cap 60. The cap 60, as it is tightened upon the spindle 16, urges the collet 17 inwardly, thereby compressing the collet head 57 and securely holding the drill 63 in position to be worked upon.

The spindle 16, together with the supported drill 63, is driven by the motor 49 (Fig. 6). Power from the motor 49 is transmitted through the gear box 49a to a pulley 49b mounted upon the output shaft from the gear box and from thence through a V belt 49c and a driven pulley 50 to the spindle 16, thereby rotating it.

The drive from the pulley 50 to the spindle 16 incorporates a friction clutch arrangement (Fig. 3). The hollow drive shaft or draw bar 48, which is carried within the left end of the bore of the spindle 16, has an internal thread 59 at its right end adapted to mate with an external thread 58 upon the shank 56 of the collet 17. The pulley 50 has an offset hub portion 51 which is loosely mounted upon the left end of the shaft 48 between a shoulder 52 on the shaft and the end surface 53 of the spindle 16. An end portion 48a of the shaft 48 has a reduced cross-section extending outwardly beyond the shoulder 52 and is squared to receive a lever or crank handle 54 for turning the shaft. By turning the handle 54, the threads 58 and 59 may be tightened or loosened. As the threads are tightened, the hub 51 of the pulley is tightly grasped between the shoulder 52 upon the shaft 48 and the end surface 53 of the spindle 16 to permit the transmission of power from the pulley 50 to the spindle 16. Upon loosening, the drive is disconnected. The crank handle is readily detachable from the shaft, so that it may be removed after the completion of the tightening of the drive connection.

If for any reason it is desired not to use the cap 60 for securing the drill 63 within the collet 17, then the tightening of the threads 58 and 59 on the shaft 48 and collet 17 respectively, will draw the collet 17 inwardly sufficiently far to squeeze together the collet head 57 and the one tightening operation may be used both for engaging the pulley drive and for securing the drill in the spindle.

The rotation of the spindle 16, just described, is also used to reciprocate the spindle head 18 transversely with respect to the axis of rotation of the spindle (Fig. 6). The straps 19 for supporting the spindle head 18 above the front table 13, are so constructed and arranged that they prevent longitudinal movement of the spindle head. In addition they normally maintain the work table in a central transverse position on the front table, but permit of an arcuate transverse movement. This transverse movement is made possible by using spring metal for the straps and by spacing the spindle head slightly above the front table 13, as is indicated at 34.

A peripheral cam 21 of a cam and lever mechanism, which produces this transverse movement of the spindle head, is formed as a part of a sleeve 35 which is mounted upon the spindle 16. The cam and sleeve may be rotated upon the spindle 16, so that the relation between the cam surfaces and the drill being ground may be selected. After the proper relation has been selected, then the cam and sleeve are secured against rotation upon the spindle by means of a set screw 21a.

The cam 21 (Fig. 8) has a continuous cam surface 23 comprising two identical portions of 180° in extent arranged opposite each other. Each of these portions is curved and generally convex circumferentially, the curve being generated upon a radius which progressively increases in counterclockwise direction from a minimum at approximately 0° to a maximum at approximately 180° where the curve abruptly terminates in a projection 22. A generally concave connecting portion lies intermediate each projecting portion 22 and the adjacent point of minimum radius.

A cam follower in the form of a roller 24 is rotatably mounted on a lever 25, which is secured rigidly to one end of the rock shaft 26. The other end of shaft 26, which is rotatably mounted in the longitudinal bore 27 in the spindle head 18, projects from the bore 27 and has a semi-cylindrical cam 28 of enlarged diameter. A block 32 is rigidly secured to the table 13, as by means of a screw 33, and has an overhanging extension 31. The diameter or straight side 29 of the cam 28 is adapted to engage the straight under surface 30 of the overhanging extension with a sliding rocking motion, so as to rock on the lower right corner of the extension 31 (Fig. 8). The rotation of the spindle 16 and the cam 21 in counterclockwise direction rocks the shaft 26 as the cam surface 23 moves upon the roller 24 and causes the cam 28 to rotate slightly. The rotation of the cam 28 urges its diameter 30 against the lower right corner of the extension 31 and urges the axis of the shaft 26 away from the straight under surface 30 of the extension 31 of the block 32. As the axis of the shaft 26 moves downwardly, the straps 19 flex to displace the spindle head 18 and the spindle 16 downwardly in relation to the normal axis of the spindle.

As the cam 21 is rotated in a counter-clockwise direction (Fig. 8), the spindle head 18 assumes the position indicated in dotted lines as the projection 22 displaces the roller 24 upon each half revolution of the cam. This displacement occurs abruptly as the roller 24 approaches a projection 22, then as the contact between the roller and the cam surface passes from a projection, that is the point of maximum radius, through approximately 180° to a remote point of minimum radius, the spindle head 18 is gradually and progressively permitted to assume its normal position. This cycle recurs with each half revolution of the cam and spindle. The extent of the displacement or transverse movement of the spindle head and the spindle is determined by the difference between the maximum radius and the minimum radius of the cam surface, and is diminished considerably by the action of the lever 25, and semi-circular cam, 29, arrangement. Through the use of this cam and lever mechanism relatively large variations in the shape of the cam surface 23 may be used to accurately control slight variations in the displacement of the spindle head and the necessity for accurately forming a cam surface to extremely close tolerances is minimized.

In addition to the rotative and transverse movements just described, the spindle 16 also is given a longitudinal reciprocating movement with respect to the spindle head 16. Its longitudinal movement is effected through the use of a spring pressed cam mechanism (Fig. 3) in which a double rise face cam 36, a cam follower in the form of a roller 39, and coil springs 43 are the principal elements. The cam 36 is mounted upon the sleeve 35 and is rotatable thereon so that the relation of the cam surfaces with respect to the surfaces on the cam 21 may be adjusted. Upon selection of the proper relation, the cam 36 may be secured to the sleeve 35, preferably by means of a set screw 37. The face of cam 36 remote from the cam 21 (Figs. 7 and 11) has a continuous cam surface comprising two identical portions of 180° in extent arranged opposite each other and terminating in two spaced diametrically opposite projections 38. This cam surface is spaced radially from the axis of the cam 36 and is formed longitudinally with respect to the axis of the cam. The surface of the cam 36 uniformly rises from a minimum at a point adjacent the projections 38 to a maximum at those projections in a clockwise direction, as illustrated in Fig. 7.

The cam follower consists of a roller 39 rotatably mounted upon a stub shaft 40 secured to the upper surface of the left side of the front table 13. Abutment between the face of the cam 36 and the cam roller 39 is maintained by a plurality of coil springs 43. The coil springs are mounted around the spindle 16 and are compressed between the sleeve 35 and an anti-friction thrust bearing 42. Bearing 42 is mounted upon the spindle 16 and takes up the thrust of the springs 43 against the rear face 41 of the spindle head 18. The anti-friction feature of the bearing is desirable since the springs are secured within recesses 43a in the forward face of the sleeve 35 and revolve with the sleeve.

The roller 39 is arranged to roll upon the face of the cam 36 and its engagement with the face of the cam 36, as it is rotated, imparts a longitudinal movement to the spindle 16 to the extent of the depth of the cam surface of the cam 36 upon each half revolution of the spindle. Starting at the low point on the cam face, rotation of the spindle and cam in a counter-clockwise direction (Fig. 8) presents to the spindle 16 a gradual feeding movement toward the right (Fig. 3) until projection 38 on the cam face reaches the roller 40. Immediately after reaching the projection 38, the sharp drop-off in the face of the cam enables the springs 43 to return the spindle 16 to its initial position with a rapid return movement. This cycle is repeated twice for each revolution of the spindle 16 and its associated cam 36.

The grinding head 64 (Figs. 1 and 2) supports the grinding wheel 72 which is used to work upon the drill to be ground in the machine and is mounted upon the rear slide 65. The rear slide 65 is slidably positioned upon the rear leg 12b of the block 12 for transverse movement with respect to the axis of the spindle 16 through the provision of a dovetail way upon the upper surface of the rear leg 12b, which mates with a corresponding dovetailed lower surface 66 of the rear slide. The transverse adjustment of the rear slide is produced and maintained by the rotation of a hand wheel 67 on the front of the base 12. The hand wheel 67 is securely fastened to the front end of a shaft 68 which is journaled within the base 12. The rear end of the shaft 68 is provided with a threaded portion 68a which engages a nut 65a secured to the lower surface of the rear slide. Rotation of the hand wheel in one direction brings the rear slide toward the spindle axis and rotation in the other direction moves it away.

The grinding head 64 is secured to an L-shaped bracket 65b at the front of the rear slide and is driven by a motor 75 mounted at the rear of the rear slide. The grinding head frame 64a is generally U-shaped with a pair of upstanding opposed arms 74. In order to provide for angular adjustment of the grinding head, the lower portion of the frame 64a is shaped in the form of a quadrant (Fig. 2) which mates with a corresponding cut-out in the front face of the bracket 65. In order to hold the grinding head in the desired angular position two spaced bolts 69 are inserted into the bracket 65b through two arcuate slots 70 in the grinding head frame 64a. The grinding head frame is then held rigidly against rotation with respect to the bracket 65b by nuts 71 threaded upon the bolts 69. Calibrations may be provided on adjacent portions of the grinding head frame and the bracket 65b for indicating the angular position of the grinding head.

The grinding wheel 72 is secured to a spindle 73 which is supported in anti-friction bearings 79 positioned in the upper portion of the opposed arms 74. The spindle is secured therein by means of nuts 80 and is driven by the motor through motor pulley 81, V belt 82 and spindle pulley 83. By having the motor removed from the spindle head and by using a flexible V belt, the drive from the motor to the grinding wheel spindle is unaffected, practically, by the normal variations in the angle of the grinding head. The grinding head 64 is maintained rigid and the grinding wheel 72 is protected by a guard 84 which lies over the grinding wheel and is fastened to the tops of the opposed arms 74 with nuts 85. A pair of slots 81 is provided in the guard to permit of its adjustment with respect to the grinding wheel. The grinding wheel 72 is chamfered so as to provide a circumferential grinding surface 76 and a bevel grinding surface 77 in predetermined angular relationship therewith.

The machine is intended to be used for grinding the lips and leading edges of a step drill. In operation, for example, the circumferential surface 76 of the grinding wheel is used to grind the sides of the lips of the first step of the drill and the bevel grinding surface 77 is used to grind the faces of the leading edges of the second step of the drill (Figs. 9 and 10). Accordingly, the wheel selected to be used must have an angle between the circumferential grinding surface 76 and the beveled grinding surface 77 to correspond to the angle of the leading edge of the second step of the drill. In a drill of the type to be ground in this machine it is necessary to provide for the relief of the cutting edges of the drill. This relief is ordinarily procured by a clearance between the cutting edge of the drill and the trailing edge, customarily referred to as rake.

The rake for the sides of the lips of the first step is provided for through the action of the peripheral cam 21 and its associated lever mechanism in their production of transverse movement to the spindle head, and the rake of the leading edges of the lips of the second step of the drill is provided for through the action of the face cam 36 and its associated mechanism in their production of longitudinal movement of the spindle head and by the proper angular adjustment of the grinding wheel head 64.

The proper relation between the two rakes which are to be ground is selected by the rotational adjustments of the cams 21 and 66 with respect to the drill being ground, and is maintained through the tightening of the respective set screws. Once set, all similar drills being ground must be chucked at the same angle with respect to the cams 21 and 66.

When the machine has been properly set up and work has been chucked, then the drill and the grinding wheel are moved into operative position through the manipulation of hand wheels 47 and 67 respectively. Ordinarily the arrangement will be such that grinding will commence with the foremost portions of the drill to be ground and to this end the parts will be arranged in position so that grinding will commence with the drill away from the grinding wheel. Upon power being applied to the spindle and the grinding wheel, both will rotate in counter-clockwise direction (Fig. 8) and grinding will proceed with the drill feeding toward the grinding wheel, both transversely and longitudinally in relation to the axis of the drill, for approximately one-half revolution of the drill, the drill then being rapidly returned. This cycle recurs with each half revolution of the drill.

The invention is not limited to the grinding of two-lipped drills or to a machine embodying two-division cams, such as those which have been described and are shown in the drawings. Cams embodying any desired number of divisions, whether equal or unequal, may be employed; for example, cams embodying cam surfaces of 90° (as indicated in dotted lines in Fig. 7 and Fig. 12) or any other suitable number of degrees in extent may be employed, the cam surfaces being correlated and formed according to the form of drill to be ground and the desired rake or clearance to be provided.

Changes may be made in the form, construction and arrangement of the parts without departing from the spirit of the invention, and the right is hereby reserved to make all such changes as fairly fall within the scope of the following claims.

The invention is hereby claimed as follows:

1. A drill grinding machine comprising a support frame, a grinding wheel and means to mount the wheel on said frame, chuck supporting means carried on said frame, a work holding chuck rotatable in said supporting means about the longitudinal axis of the chuck, driving means for turning the chuck, said supporting means being rockable on said base transversely with respect to said longitudinal axis, said chuck having a portion extending outwardly of said supporting means, cam means comprising a collar and means to secure the same in angularly adjustable position on said chuck, means forming a face cam and an edge cam on said collar, one of said cams at least being angularly adjustable on the collar, an abutment roller on said frame in position to cooperate with said face cam, as the chuck rotates, to axially reciprocate said chuck in said supporting means, and cam actuated means co- operatively associated with the other cam member for rocking said supporting member in response to chuck rotation.

2. In a machine of the class described, a base, a grinding member and spindle head carried thereby, a spindle journalled in said head, means to rotate said spindle, said head being mounted for rocking movement, a cam carried by and rotatable with said spindle, a lever pivotally mounted on said head and having a follower coacting with said cam, a block carried by said base, said lever being provided with means contacting said block under actuation of said cam and coacting with said block to rock said head.

3. In a machine of the class described, a base, a grinding member and spindle head carried thereby, a spindle journalled in said head, means to rotate said spindle, said head being mounted for rocking movement, a cam carried by and rotatable with said spindle, a lever pivotally mounted on said head and having a follower coacting with said cam, a block carried by said base, said lever being provided with means contacting said block under actuation of said cam and coacting with said block to rock said head, a second cam on said head and rotatable with said spindle means coacting with said second cam during rotation thereof to reciprocate said spindle, and means to rotate said first and second named cams in timed relation.

4. In a machine of the class described, a base, a grinding member and a spindle head carried thereby, a spindle journalled in said head, means to rotate said spindle, said head being mounted for rocking movement, a cam carried by and rotatable with said spindle, means to rotate the same, a lever having a follower in contact with said cam and coacting therewith, a shaft journalled in said head, said lever being mounted upon said shaft, a block carried by said base, said shaft being provided with means bearing against the said block and coacting therewith under actuation of said cam to rock said head.

5. In a machine of the class described, a base, a grinding member and a spindle head carried thereby, a spindle journalled in said head, means to rotate said spindle, said head being mounted for rocking movement, a cam carried by and rotatable with said spindle, means to rotate the same, a lever having a follower in contact with said cam and coacting therewith, a shaft journalled in said head, said lever being mounted upon said shaft, a block carried by said base, said shaft being provided with means bearing against the said block and coacting therewith under actuation of said cam to rock said head, a resilient strap flexibly securing said head to said base.

6. In a grinding machine having a base, a work holding spindle, a front slide longitudinally slidable on the base, a spindle head spaced above the front slide in which the spindle is rotatably mounted and longitudinally slidable, bars connecting the spindle head to the front slide at one side of the machine, a grinding wheel, a rear slide in which the grinding wheel is mounted perpendicularly positioned in relation to the said front slide also longitudinally slidable on said base and provided with means for adjusting the angle of the grinding wheel; a combination cam having spaced cam surfaces on the periphery and also spaced transversely disposed cam surfaces on an end thereof, a rocker arm on a shaft journaled in the spindle head carrying a roller positioned to engage the said peripheral cam surfaces, said shaft having a horizontally disposed flat surface thereon and positioned on the side of the spindle head opposite to that on which the bars connecting the spindle head to the front slide are positioned, a stationary block extending upward from the front slide having a flat surface positioned to coact with the flat surface of the shaft to actuate the shaft and one side of the spindle head vertically as the spindle rotates, a roller mounted on the front slide positioned to coact with the transversely disposed cam surfaces to actuate the spindle longitudinally, and means urging the cam toward the roller mounted on the front slide of the machine.

7. In a grinding machine having a base, a work holding spindle, a spindle head in which the spindle is rotatably mounted and longitudinally slidable, a front slide longitudinally slidable on the base, and a grinding wheel adjustably mounted on the base; means mounting said head on said slide for rocking movement of the head, a combination cam having spaced cam surfaces on the periphery and also spaced transversely disposed cam surfaces on an end thereof, a rocker arm on a shaft journaled in the spindle head carrying a roller positioned to engage the said peripheral cam surfaces of the cam, said shaft having a flat surface at one end thereof, a stationary block mounted on the front slide having a flat surface positioned to coact with the flat surface at the end of the shaft to rock the spindle head vertically as the cam rotates, means adjustably mounting the cam on the spindle at one end of the spindle head, a roller mounted on the front slide positioned to coact with the transversely disposed cam surfaces to actuate the spindle longitudinally, and means positioned between the cam and end of the spindle head urging the cam toward the roller on the front slide.

8. In a grinding machine having a base, a work holding spindle, a spindle head in which the spindle is rotatably mounted and longitudinally slidable, a front slide longitudinally slidable on the base, means mounting said head on said slide for rocking movement of the head and a grinding wheel adjustably mounted on the base; a flange carrying peripheral cam surfaces and having an extending hub adjustably mounted on the spindle, a rocker arm journaled in the spindle head having a flat surface at one end, a roller carried by the rocker arm positioned to be engaged by the cam surfaces of the flange, a stationary block on the front slide having a surface positioned to coact with the flat surface of the rocker arm to elevate one side of the spindle head as the spindle rotates, a collar adjustably mounted on the hub of the flange having cam surfaces on one end thereof transversely disposed in relation to the spindle, a roller mounted on the front slide positioned to coact with the cam surfaces of the collar to actuate the spindle longitudinally, and resilient means on the head urging the collar and spindle toward the roller on the front slide.

9. In a drill grinding tool, the combination, which comprises, a base, a work holding spindle, a front slide, a spindle head positioned on the front slide in which the spindle is rotatably mounted and longitudinally slidable, flexible straps connected to corresponding sides of the front slide and spindle head connecting the slide and head at one side of the tool, a grinding wheel, a rear slide perpendicularly positioned in relation to the front slide also slidably mounted on the base, a grinding wheel mounting swingably mounted on said rear slide adapted to turn about a center in the same plane as the axis of the grinding wheel, means clamping the grinding wheel mounting in adjusted positions on said rear slide, a hub having an extending flange adjustably mounted on the spindle cam surfaces on the periphery of the flange and end of the hub, rocking means between the front slide and spindle head coacting with the said cam surfaces to rock the spindle head, and stationary means on the front slide coacting with the cam surfaces on the end of the hub of the flange to actuate the spindle longitudinally.

10. In a drill grinding tool, the combination, which comprises, a base, a front slide, a spindle head rockably mounted on the front slide, a tubular spindle having an extending threaded nipple at one end rotatably mounted and longitudinally slidable in said spindle head, a work holding collet positioned in the end of the spindle extending through the threaded nipple, a collet locking nut threaded on the threaded nipple holding the collet in the end of the spindle, a crank with an extending tubular shank positioned in the spindle providing actuating means for the collet, means slidably mounting the said front slide on the base for longitudinal travel of said slide, a grinding wheel, a rear slide perpendicularly positioned in relation to the front slide also slidably mounted on the base, a grinding wheel mounting swingably mounted on said rear slide adapted to turn about a center in the same plane as the axis of the grinding wheel, means clamping the grinding wheel mounting in adjusted positions on said rear slide, a hub having an extending flange adjustably mounted on the spindle cam surfaces on the periphery of the flange and end of the hub, rocking means between the front slide and spindle head coacting with the said cam surfaces to rock the spindle head, and stationary means on the front slide coacting with the cam surfaces on the end of the hub of the flange to actuate the spindle longitudinally.

WALTER UMBDENSTOCK.

REFERENCES CITED

The following references are of record in the file of this patent:

UNITED STATES PATENTS

| Number | Name | Date |
| --- | --- | --- |
| 1,323,452 | Cogsdill | Dec. 2, 1919 |
| 1,402,473 | Bickford | Jan. 3, 1922 |
| 1,624,933 | Durkee | Apr. 19, 1927 |
| 1,651,432 | Bath et al. | Dec. 6, 1927 |
| 1,870,718 | Drake | Aug. 9, 1932 |
| 1,981,263 | Croft | Nov. 20, 1934 |
| 2,032,011 | Gould | Feb. 25, 1936 |
| 2,099,724 | Cogsdill | Nov. 23, 1937 |
| 2,109,308 | Adams | Feb. 22, 1938 |
| 2,130,575 | Adams | Sept. 20, 1938 |
| 2,251,961 | Snader | Aug. 12, 1941 |
| 2,258,727 | Bannister | Oct. 14, 1941 |
| 2,325,364 | Boening | July 27, 1943 |

FOREIGN PATENTS

| Number | Country | Date |
| --- | --- | --- |
| 431,046 | Great Britain | July 1, 1935 |